United States Patent
Howe

(10) Patent No.: US 10,338,294 B2
(45) Date of Patent: Jul. 2, 2019

(54) CROSS RUNNER LIGHT FIXTURE

(71) Applicant: Southpac Trust International Inc., Trustee of the LDH Trust, Rarotonga (CK)

(72) Inventor: Leslie David Howe, Ottawa (CA)

(73) Assignee: Southpac Trust International Inc., Trustee of the LDH Trust, Rarotonga (CK)

( * ) Notice: Subject to any disclaimer, the term of this patent is extended or adjusted under 35 U.S.C. 154(b) by 0 days.

(21) Appl. No.: 15/054,203

(22) Filed: Feb. 26, 2016

(65) Prior Publication Data
US 2017/0242177 A1  Aug. 24, 2017

Related U.S. Application Data

(60) Provisional application No. 62/177,755, filed on Mar. 23, 2015.

(51) Int. Cl.
| | |
|---|---|
| *G02B 6/00* | (2006.01) |
| *F21V 8/00* | (2006.01) |
| *F21S 8/02* | (2006.01) |
| *F21Y 115/10* | (2016.01) |
| *F21Y 115/15* | (2016.01) |

(52) U.S. Cl.
CPC ............. *G02B 6/002* (2013.01); *F21S 8/026* (2013.01); *G02B 6/0021* (2013.01); *G02B 6/0023* (2013.01); *G02B 6/0046* (2013.01); *G02B 6/0055* (2013.01); *G02B 6/0068* (2013.01); *G02B 6/0085* (2013.01); *F21Y 2115/10* (2016.08); *F21Y 2115/15* (2016.08)

(58) Field of Classification Search
CPC .. G02B 6/0055; G02B 6/0031; G02B 6/0066; F21S 8/026
See application file for complete search history.

(56) References Cited

U.S. PATENT DOCUMENTS

| | | | | |
|---|---|---|---|---|
| 2005/0265044 A1* | 12/2005 | Chen | .................... | G02B 6/0028 362/558 |
| 2006/0061537 A1* | 3/2006 | Yu | ......................... | G02B 6/0088 345/102 |
| 2007/0171678 A1* | 7/2007 | Shim | .................... | G02B 6/0016 362/616 |
| 2009/0237958 A1* | 9/2009 | Kim | ......................... | F21S 8/026 362/617 |
| 2009/0273732 A1* | 11/2009 | Shimura | .............. | G02B 6/0016 349/65 |
| 2010/0284185 A1* | 11/2010 | Ngai | ......................... | E04B 9/00 362/235 |
| 2011/0242800 A1* | 10/2011 | Borghetto | ........... | E04F 13/0885 362/147 |
| 2012/0328242 A1* | 12/2012 | Hesse | .................. | G02B 6/0018 385/36 |
| 2013/0120669 A1* | 5/2013 | Kuromizu | ............ | G02B 6/0033 348/790 |
| 2013/0294061 A1* | 11/2013 | Sorensen | .................. | F21S 8/06 362/223 |

(Continued)

*Primary Examiner* — Julie A Bannan
(74) *Attorney, Agent, or Firm* — Troutman Sanders LLP; James E. Schutz; Mark Lehi Jones

(57) ABSTRACT

In an example embodiment, a cross runner of a suspended ceiling grid is provided, wherein the cross runner may comprise a light fixture configured to function as a cross runner, and the light fixture may comprise a light guide.

12 Claims, 11 Drawing Sheets

(56) References Cited

U.S. PATENT DOCUMENTS

| | | | |
|---|---|---|---|
| 2013/0308303 A1* | 11/2013 | Greenholt | F21V 33/006 362/150 |
| 2014/0003092 A1* | 1/2014 | Takada | G02B 6/0093 362/624 |
| 2014/0036503 A1* | 2/2014 | Olsen | F21S 8/026 362/249.02 |
| 2014/0085924 A1* | 3/2014 | Li | G09F 13/18 362/606 |
| 2014/0347885 A1* | 11/2014 | Wilcox | F21S 8/061 362/612 |
| 2015/0138779 A1* | 5/2015 | Livesay | F21S 8/026 362/298 |
| 2015/0177439 A1* | 6/2015 | Durkee | G02B 6/0021 362/555 |
| 2016/0178146 A1* | 6/2016 | Oleske | F21V 21/04 52/28 |

\* cited by examiner

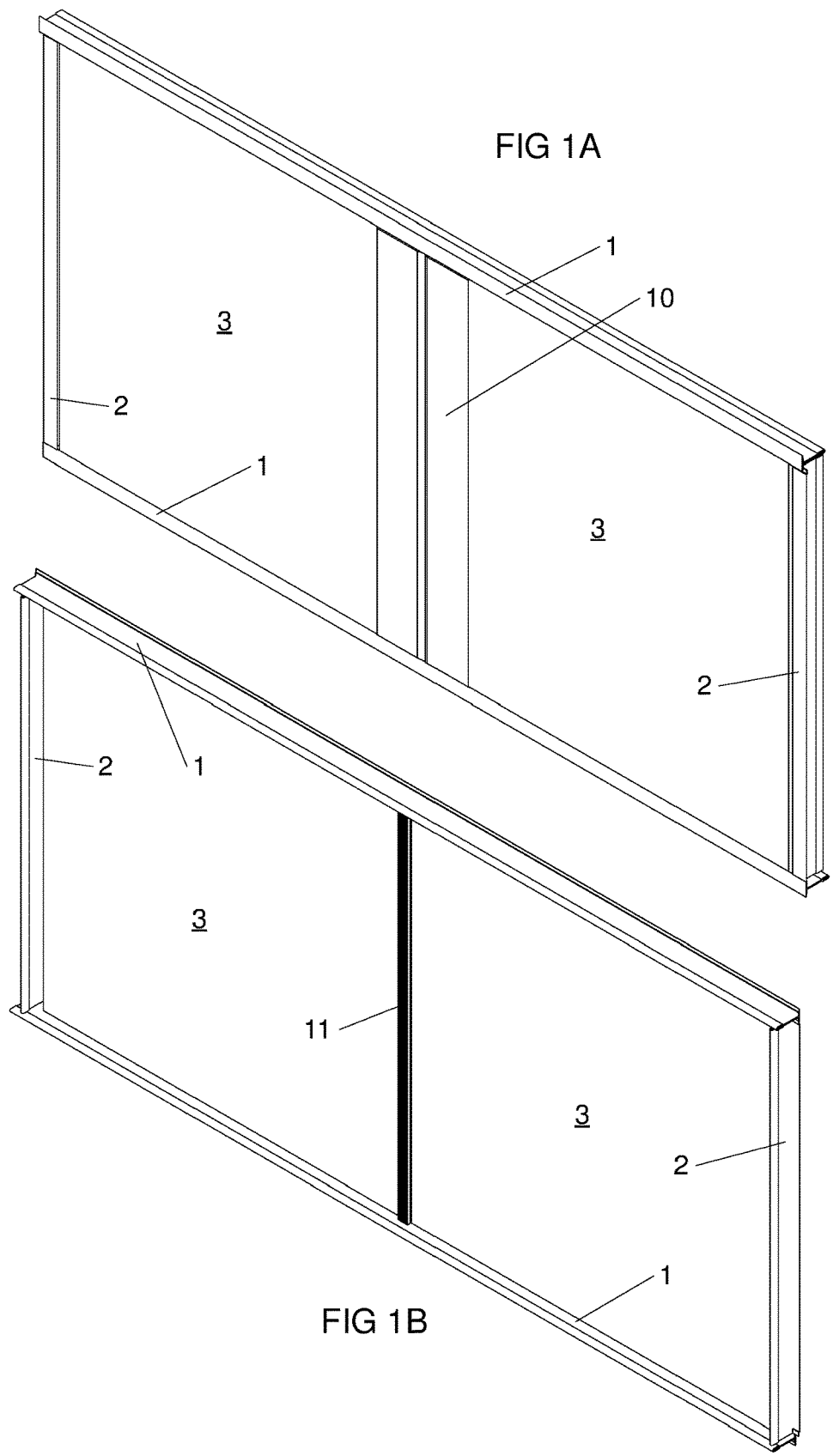

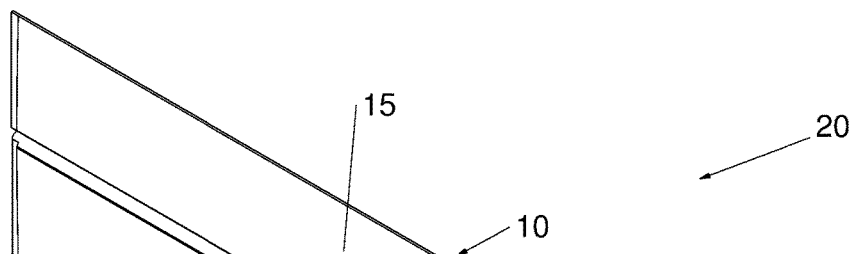
FIG 3A
FIG 3B
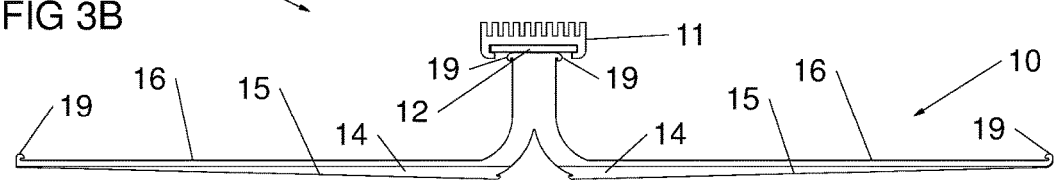
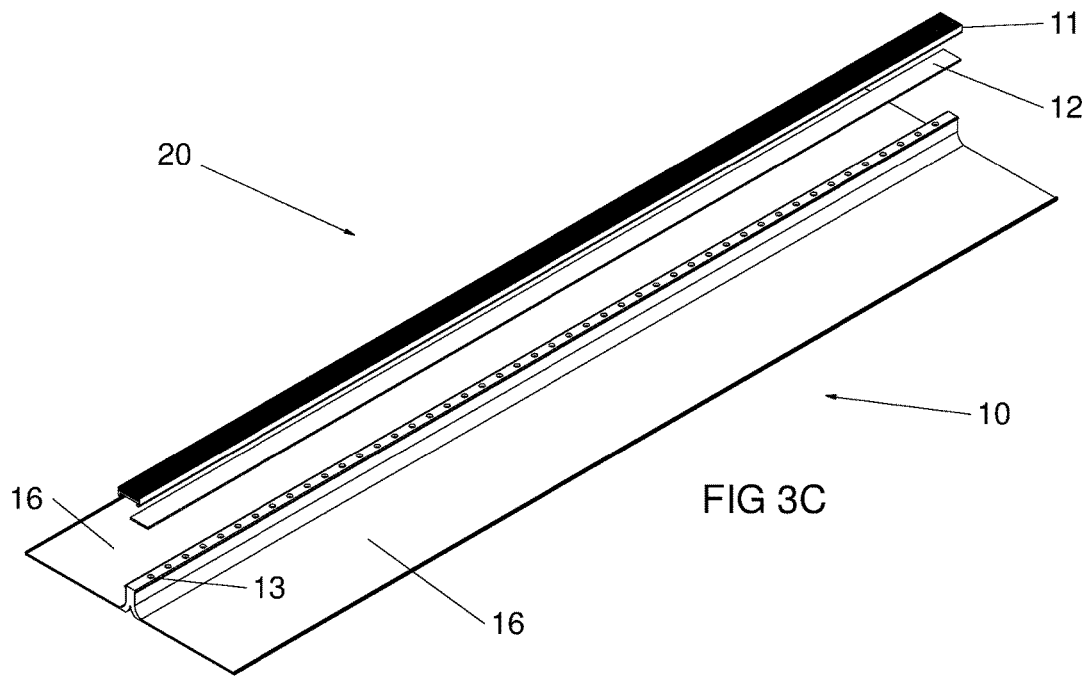
FIG 3C

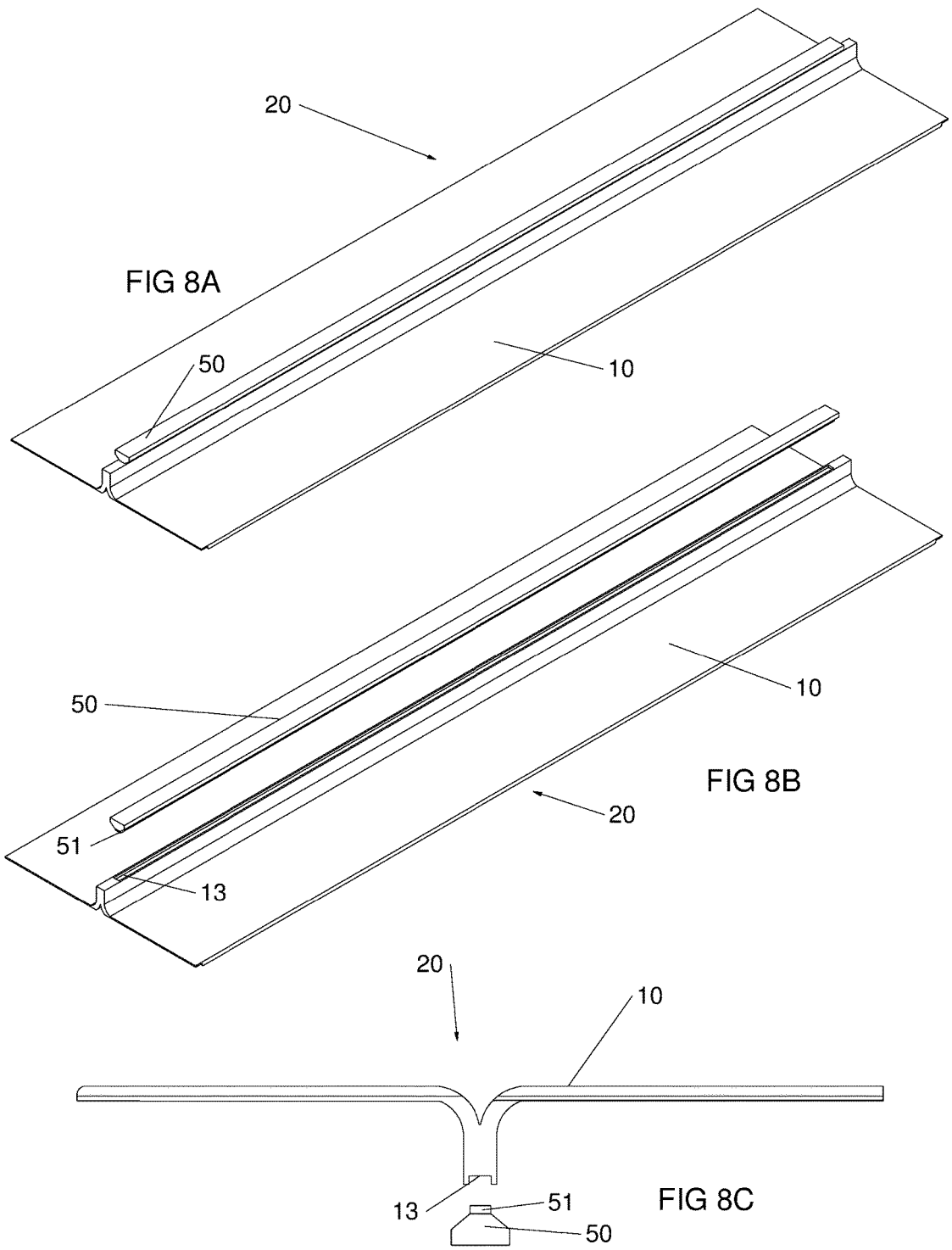

US 10,338,294 B2

CROSS RUNNER LIGHT FIXTURE

RELATED APPLICATIONS

This application claims the benefit of the following U.S. Provisional Patent Applications, the contents of which are incorporated by reference in their entirety as if set forth in full: U.S. Provisional Patent Application No. 62/176,860 entitled "Light Fixtures and Light Guides," filed Mar. 3, 2015, and U.S. Provisional Patent Application No. 62/177,755 entitled "Cross Runner Light Fixture," filed Mar. 23, 2015

TECHNICAL FIELD

This disclosure generally relates to lighting, light guides, and light fixtures.

BACKGROUND

There is a continuing need for innovative lighting systems that utilize LED light sources that may enable high functionality and aesthetics, with a low manufacturing cost.

BRIEF DESCRIPTION OF THE FIGURES

FIG. 1A shows a front perspective view of an example embodiment of light fixture mounted in a portion of a suspended ceiling grid.

FIG. 1B shows a back perspective view of the example embodiment of light fixture mounted in a portion of a suspended ceiling grid as shown in FIG. 1A.

FIG. 3A shows a front perspective view of an example embodiment of light fixture comprising a light guide.

FIG. 3B shows a side view of the example embodiment of light fixture comprising a light guide as shown in FIG. 3A.

FIG. 3C shows an exploded perspective view of an example embodiment of light fixture comprising a light guide as shown in FIG. 3A.

FIG. 8A shows a perspective view of an example embodiment of light fixture comprising a light guide and a remote phosphor LED light source.

FIG. 8B shows a perspective exploded view of the example embodiment of light fixture comprising a light guide and a remote phosphor LED light source as shown in FIG. 8A.

FIG. 8C shows a side exploded view of the example embodiment of light fixture comprising a light guide and a remote phosphor LED light source as shown in FIG. 8A.

SUMMARY

Figure 2A:
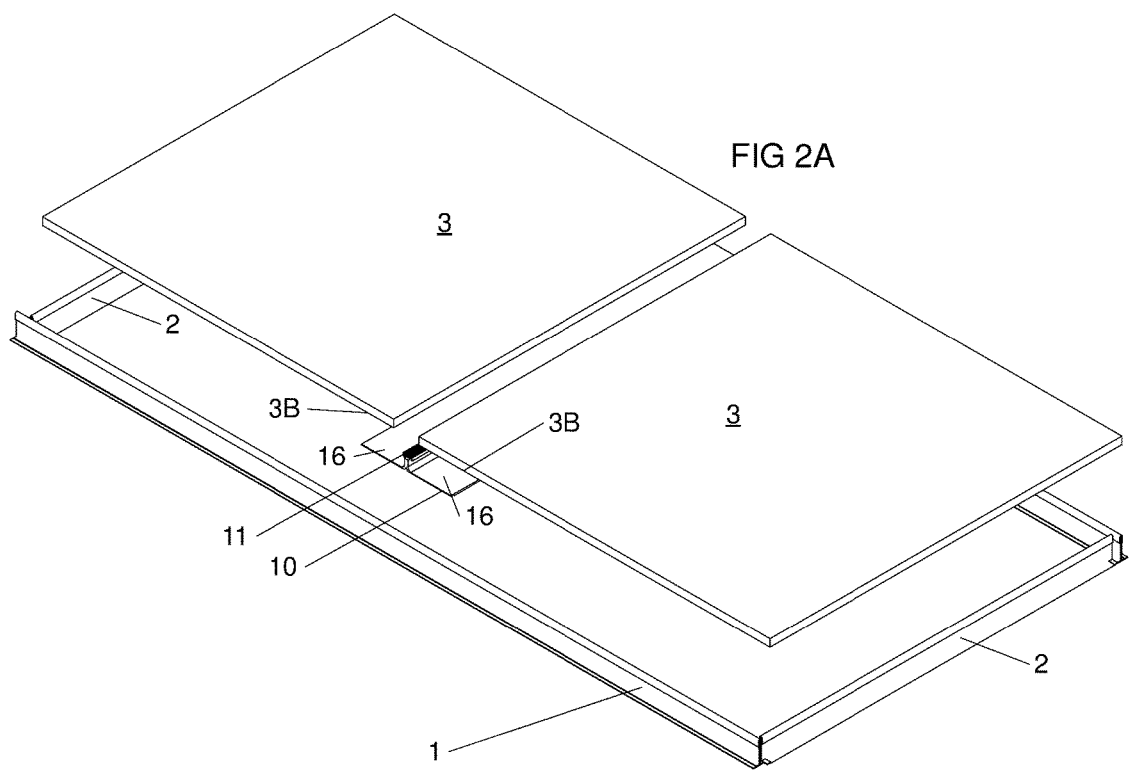
FIG. 2A shows a back exploded perspective view of the example embodiment of light fixture mounted in a portion of a suspended ceiling grid as shown in FIG. 1A.

In an example embodiment of the disclosed technology, a light fixture may be configured to mount on a suspended ceiling grid. The light fixture may comprise a light guide configured for the transmission of light through total internal reflection. The light guide may comprise one or more front side surfaces, wherein each front side surface may comprise two opposing ends, wherein each opposing end may comprise an indentation. The light guide may further comprise one or more back sides, at least one edge configured for coupling with a light source, and light extracting features configured on at least a portion of one of the one or more front side surfaces. All or a portion of the indentations of opposing ends of the front side surfaces of the light guide may be configured for engaging with, or being disposed in close proximity above a corresponding inner surface of a main runner in a suspended ceiling grid, and a portion of the one or more back sides of the light guide may be configured to engage with, or be disposed in close proximity below a portion of the front side of one or more ceiling tiles of the suspended ceiling grid after installation of the light fixture in the suspended ceiling grid.

In an example embodiment of the disclosed technology, a light guide may be configured for the transmission of light through total internal reflection. The light guide may comprise a central section configured for coupling with a light source, and a loop section that may comprise two ends, a front side comprising light extraction features on all or a portion of its surface, and a light reflecting back side, wherein each of the two ends may be joined to the central section, therein enabling a loop pathway for light propagation within the light guide.

In an example embodiment of the disclosed technology, a cross runner of a suspended ceiling grid may comprise a light fixture, wherein the light fixture may be configured to function as a cross runner.

DETAILED DESCRIPTION

T-bar suspended ceiling grid systems may have been widely used for a great many decades. There may be countless fluorescent light fixtures that are designed to mount in ceiling grid systems. Historically, the majority of fixture designs may be typically configured to mount in a 2'×2' grid, or a 2'×4' grid, and the fixtures may utilize linear fluorescent tubes. For many basic reasons, it may be most practical, or a necessity for fluorescent fixtures to utilize an entire grid, whether a 2'×2' or 2'×4' grid space. With the advent of LEDs, there may be much more flexibility in the size and configuration of this light source. Delivering the required lumen output for a fixture can now be done with a very small relative size, much less than the footprint of a 2'×2' ceiling grid. Despite this new flexibility, typical light fixture designs for grid ceiling applications may still be based on steel sheet metal enclosures that mount in, and occupy the same ceiling grid space in the same manner as fluorescent fixtures. There may be reasons for this.

One reason may have to do with fire and building code regulations. Ceiling tiles may be required to pass certain flammability tests and to prevent a fire from spreading to the space above. Light fixtures intended to mount in the ceiling grid in place of a ceiling tile may also be required to be fire rated, which may typically dictate a specified thickness and composition of substrate that the enclosure is fabricated from. This barrier may be required to span the entire grid space it occupies to eliminate any opening to the space above from the space below.

Another possibility may be to leave the ceiling tiles in place, and to attach a light fixture to a ceiling tile. However, it may be difficult to attach a light fixture to a ceiling tile, such as a small LED light fixture for example, as ceiling tiles may be notoriously fragile. In retrofit applications, there may be no available spare ceiling tiles of the same design, so if any get broken, it may be a costly undertaking. Additionally, ceiling tiles may age, and a new tile of the same design may be a noticeably different shade. Even if an LED fixture can be suitably attached to a ceiling tile or a ceiling grid frame member, it may still protrude below the ceiling plane, which may be unacceptable in many applications.

If an LED light fixture could be configured such that it is significantly smaller than traditional light fixtures and did not have to occupy an entire ceiling grid space, yet would pass fire code regulations, not protrude unacceptably below the ceiling plane, provide the required lumen output and distribution, as well as having a pleasing, unobtrusive aesthetic, there may be many advantages, such as manufacturing cost savings on the enclosure material, assembly, packaging, shipping etc. Example embodiments of light fixture and light guides may subsequently be described which may enable some or all of these attributes and advantages.

FIG. 3A through FIG. 3C shows an example embodiment of light fixture 20 comprising a light guide 10, a linear LED array 12, and a heat sink 11. The light fixture 20 may also perform the functions of a cross runner (or sometimes referred to as cross tee) of a suspended ceiling grid, which may include the partial supporting of ceiling tiles on one or both sides of the cross runner, and may be described later in greater detail.

The optical principals of light guides and total internal reflection, and more specifically, edge lit light guides is very well known to those skilled in the art, and edge lit light guides may be widely used in commercial lighting fixtures. Accordingly, many of the operational and functional principals of light guides will not be discussed here.

Referring to FIG. 3B, the light guide 10 may be fabricated out of any suitable light guide material, such as pmma acrylic, polycarbonate etc. The light guide 10 may include light-extracting features on the front surface 15 that may function as the light-emitting surface of the light fixture (herein referred to as the "textured surface"). The light-extracting features on the textured surface may be created using any suitable method, such as laser etching for example. Any configuration of light-extracting features that may be advantageous for a particular application may be utilized. There may be numerous light-extracting feature configurations available. For example, some light-extracting features may become progressively denser as the distance from the light source increases, which may function to create more uniform light extraction and distribution. Some light-extracting features may comprise random or non-random micro-structures. Some light extracting features may comprise a series of lines. The textured surface may include light scattering particles or features. The textured surface 15 of an example embodiment of light guide may also be indicated in FIG. 4A through FIG. 4C.

Figure 4A:
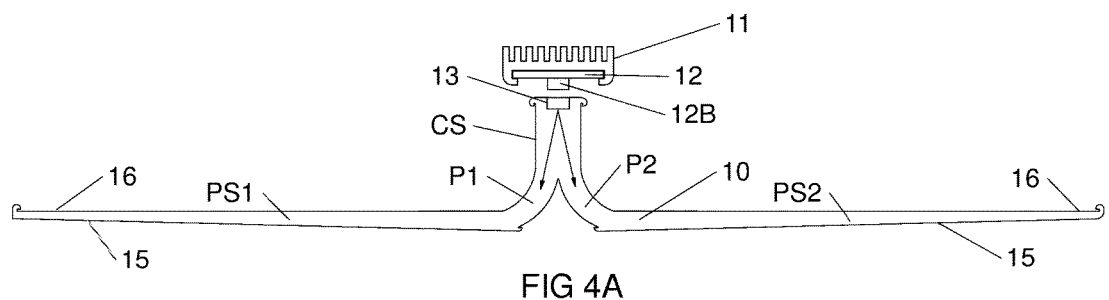
FIG. 4A shows a side cut-away view of an example embodiment of light fixture comprising a light guide indicating two separate light pathways.

In an example embodiment, the cross section profile of the light guide 10 may taper in thickness in the planar sections PS1 and PS2 as shown in FIG. 4A. As shown, the thickness of planar sections PS1 and PS2 of the light guide may be greater near the central section CS than towards the opposing outer edges. According to TIR principals, this wedge shape created by the tapering of the light guide as described may function to extract light from the light guide.

Figure 3D:
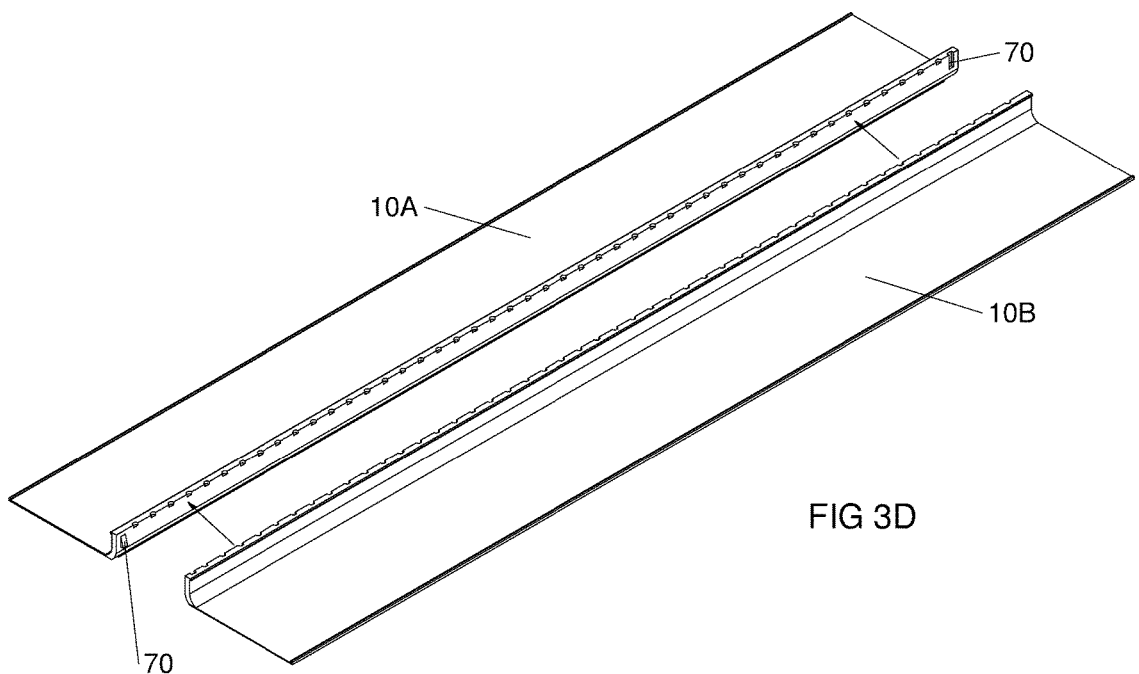
FIG. 3D shows an exploded perspective view of an example embodiment of light guide fabricated in two separate sections.
Figure 4B:
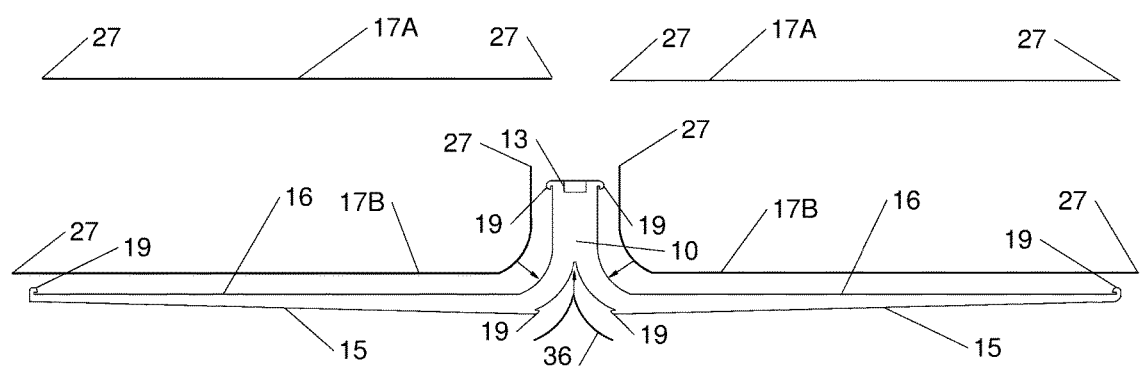
FIG. 4B shows a side exploded view of an example embodiment of light guide comprising a light guide with a front and rear reflection film feature.
Figure 4C:
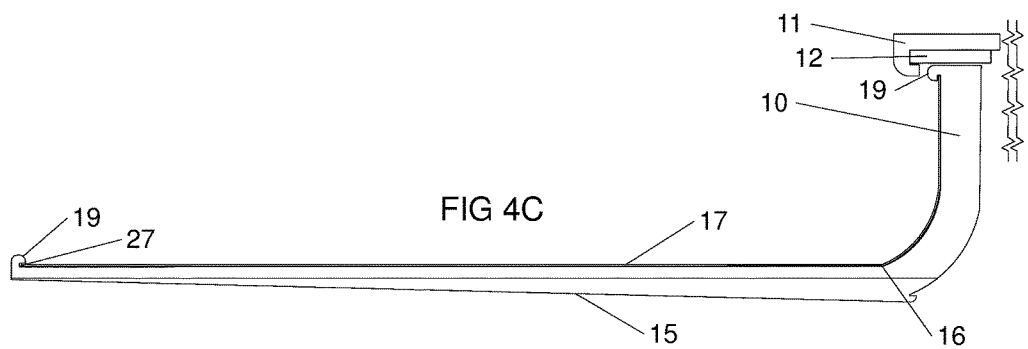
FIG. 4C shows a side view of one half of an example embodiment of light fixture comprising a light guide with a rear reflection film feature as shown in FIG. 4B.

In an example embodiment, the light guide 10 may also include a smooth back surface "smooth surface" 16 as indicated in FIG. 4A through FIG. 4C, FIG. 3B and FIG. 3C, that may function to reflect light rays within the light guide according to total internal reflection principles. In an example embodiment, the smooth surface 16 may include a novel light reflection system that may function to increase efficiency of the light guide, and may do so with a low cost, no fasteners or adhesives, and without the use of expensive reflective surface coatings such as silver or aluminum. FIG. 4B shows an exploded side view of the light guide 10, and FIG. 4C shows a side view of one side of the light guide 10 along with an LED array 12 and a heat sink 11. As shown in FIG. 4B, two pieces of reflective film may be configured similarly to that as indicated by 17A. The film may comprise any reflective film. For example, a very low cost film may include a white PETG plastic film with 98% reflectivity with a typical thickness of 188 um. The opposing edges 27 of the film pieces 17A may be inserted between corresponding edge retaining features 19 of the light guide 10, wherein the film pieces 17A may compress and become lodged and retained against the edge retaining features 19 as shown by the attached film pieces 17B (shown in an exploded view for illustrative purposes). In a similar manner, reflective film 36 may be inserted between the two corresponding edge retaining features 19 and thus become lodged and retained therein. Although the curved surfaces of the light guide 10 covered by the reflection film 36 could be configured with light extraction features and without reflection film, due to the principles of TIR, light traveling through the bends may tend to leak to a degree, which may cause an excessively bright center region of the light guide 10.

In an example embodiment, the light guide may comprise a novel feature wherein light injected into the light guide may travel down two different pathways. Referring to FIG. 4A, the central section CS of the light guide 10 may be connected to two planar sections PS1 and PS2 through curved sections or light pathways P1 and P2 respectively. Two example light rays as shown by the two arrows may travel down the two different pathways, P1 and P2. This may enable a single centrally located light source as shown, and may reduce manufacturing costs by the utilization of only a single light source as opposed to multiple light sources. It may be preferable to have a bend ratio of the curved sections greater than 2 times the thickness of the light guide substrate in order to facilitate efficient TIR functioning in the light guide.

Figure 3E:
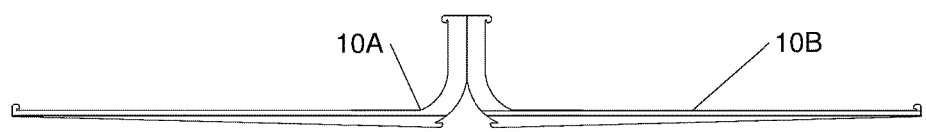
FIG. 3E shows a side view of the example embodiment of light guide fabricated in two separate sections as shown in FIG. 3D.

In example embodiments, the light guide may be fabricated from injection molding, extruding, rotational molding etc. Perhaps the most economical and practical method of fabrication for example embodiments of light guide may be injection molding. Since light guides described in example embodiment comprise two identical mirrored halves, an injection mold may only be required to be one half the size of the light guide. FIG. 3D and FIG. 3E shows an example embodiment of light guide comprising two injection molded halves, 10A and 10B. Alignment features 70 may facilitate assembly and ensure accurate alignment of the two halves. Adhesive may only be required between the two halves in the end regions to attach the two halves together. Since the light guide has two paths that light injected into the light guide may travel, the addition of an air/substrate boundary in the central region of the light guide caused by the joint between the two halves may not interfere and may in fact aid with the TIR light propagation relative to a one-piece solid light guide.

In an example embodiment, the light fixture 20 may include LED array 12 and heat sink 11 as shown in FIG. 3B and FIG. 3C. The light guide 10 may comprise light injection ports 13 as indicated in FIG. 3C. Referring to FIG. 4A which shows an exploded side cut-away view of the same, the individual LEDs 12B of the LED array 12 may nest in the light injection ports 13 of the light guide 10. There may be numerous methods of coupling LEDs to light guides to efficiently inject light into light guides. Different methods may have an associated efficiency as well as manufacturing cost which may determine which method may be most suitable for a given application. For example, as shown in FIG. 4A, after insertion of the LEDs 12B into the light injection ports 13, there may be Fresnel losses of about 7% associated with the air gap between the LEDs 12B and the surfaces of the light injection ports 13. If optical adhesive were utilized that may fill this air gap, the Fresnel losses may be reduced significantly. However, the cost of the adhesive and the application thereof may significantly increase manufacturing costs of the light guide. Accordingly, the method or methods described in various embodiments that describe injecting light into example embodiments of light guides may be example methodology for illustrative purposes only, and should not limit the general scope of example embodiments, as many other possible methods may be utilized in example embodiments.

The light source may comprise other types of light sources other than typical linear LED arrays. In an example embodiment, the light source may utilize remote phosphor LED technology. Remote phosphor technology may allow continuous surface areas of remote phosphors to be illuminated, which may provide a more diffused and evenly illuminated light source for a light guide. Referring to FIG. 8A through FIG. 8C, the light fixture 20 may comprise an LED unit that may comprise a housing 50 that includes a mixing chamber and LEDs, and a continuous strip of remote phosphors 51. The remote phosphors 51 may nest inside a light injection port 13, wherein the light source may be coupled to the light guide 10. The coupling of the remote phosphors to the light guide may be configured as previously discussed.

In an example embodiment, an OLED light source may be utilized, and may be configured in a similar manner as to that shown in FIG. 8A through FIG. 8C.

Figure 2B:
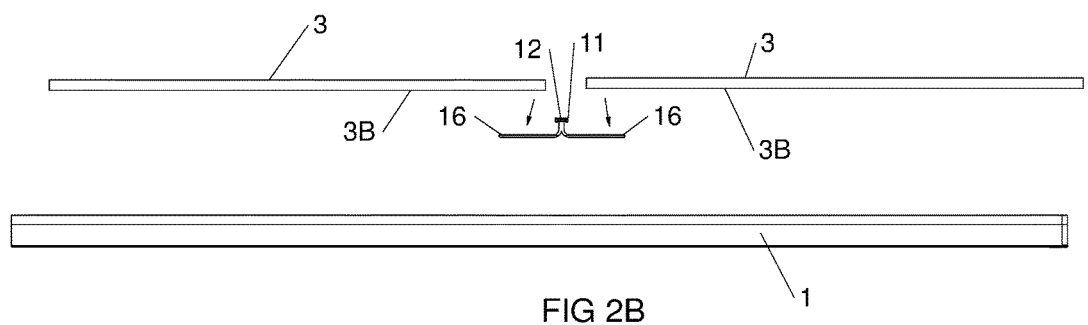
FIG. 2B shows an exploded side view of the example embodiment of light fixture mounted in a portion of a suspended ceiling grid as shown in FIG. 1A.
Figure 2C:
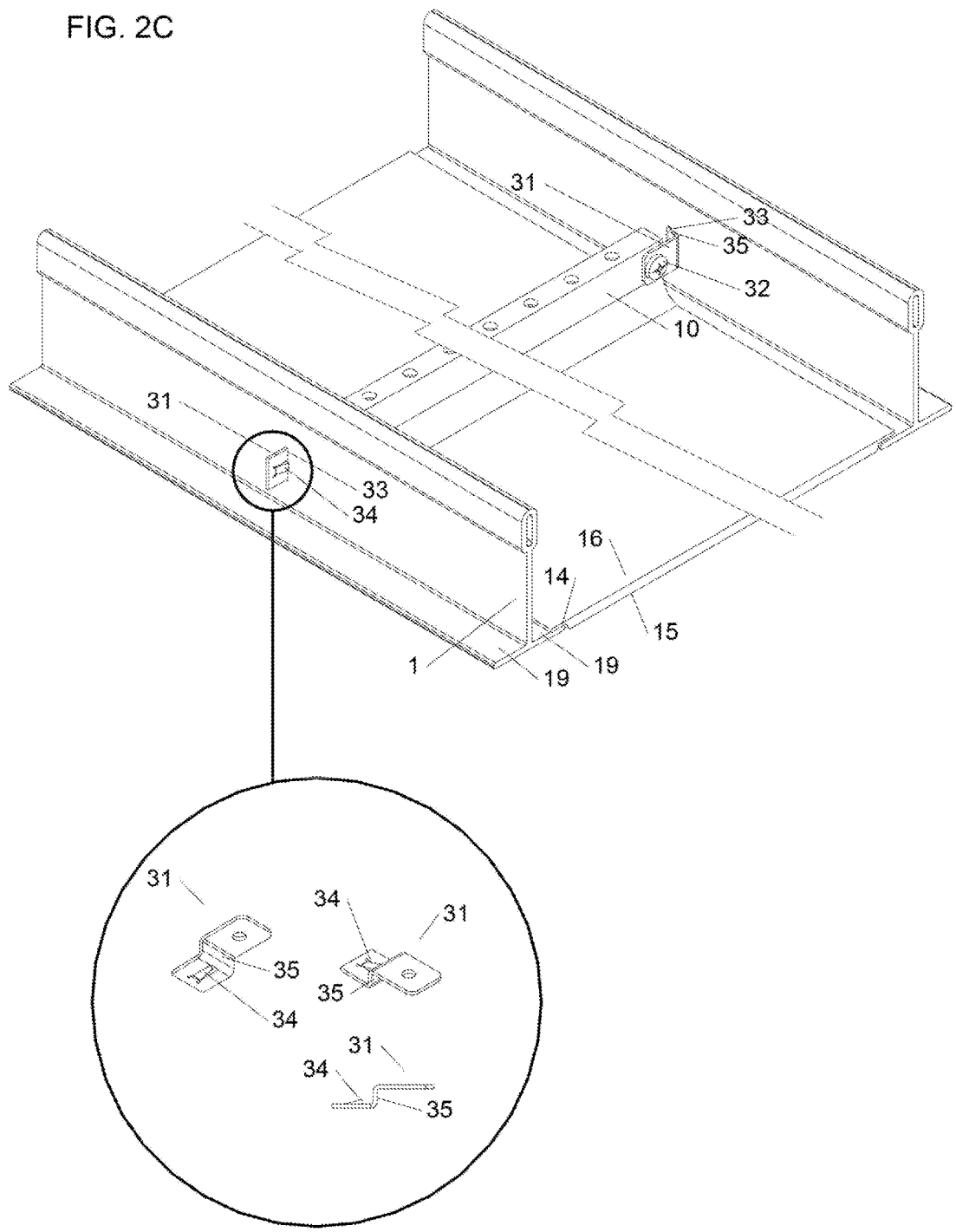
FIG. 2C shows a perspective cut-away view of the example embodiment of a light fixture mounted in a portion of a suspended ceiling grid as shown in FIG. 1A, and illustrates the light fixture's attachment to the T-bar main runner with tabs configured on each end of the light fixture.

In an example embodiment of light fixture, the light fixture may be configured to function as, and be substituted for a cross runner of a ceiling grid system. FIG. 1A shows a front perspective view, and FIG. 1B shows a back perspective view of the example embodiment of light fixture mounted in a 2'×4' section of a ceiling grid of a suspended ceiling. The main runners 1 may be the main support T-bars for the ceiling grid system, and may be suspended from the ceiling with cables etc. The cross runners 2 may typically be about 1' wide, and may be configured to span between two opposing main runners and partially support adjacent ceiling tiles 3. Once installed, the front surface of each end of the cross runners 2 may sit on the back surface of the main runners, and tabs protruding from each end of the cross runners may engage with corresponding slots in the main runner. In an example embodiment as shown in FIG. 2C, tabs 31, which may be fabricated from metal, for example, may be configured to mimic in form and function the tabs of an actual cross runner. This may ensure that the light fixture will attach to standard main runners. The tabs 31 may attach to each end of the light guide 10 with screws 32. When the light fixture is installed as shown, prongs 34 may lock into the standard slots 33 on the main runners 1 such that the tab shoulders 35 are pressed against the opposing sides of the main runners 1. Accordingly, the light fixture will function as a cross-tee wherein the light fixture and main runners 1 are securely held in place. As shown in the center region of the two ceiling tiles 3 in FIG. 1A, the light guide 10 may replace the cross runner in that section of the ceiling grid. In FIG. 1B, a heat sink 11 attached to the light guide may be seen protruding between the adjacent ceiling tiles 3. FIG. 2A shows a perspective exploded view of the example embodiment shown in FIG. 1A, and FIG. 2B shows a side exploded view. The ceiling tiles 3, main runners 1, cross runners 2, heat sink 11 and LED array 12 are shown.

As shown in FIGS. 3A and 3B in an example embodiment, the front textured side 15 of the light guide 10 may be configured with indentations 14 on each end. Referring to the exploded side cut-away view as shown in FIG. 2C, the indentations 14 may nest on a back surface 19 of the main runners 1. The textured surface 15, smooth surface 16 and heat sink 11 are also shown. Although not shown, the ends of the light guide 10 may be configured with tabs configured to insert into corresponding slots in the main runners, similar to that as described with cross runners. Referring to the exploded perspective view FIG. 2A, and the exploded side view shown in FIG. 2B, a portion of the front surface 3B of the ceiling tiles 3 may contact the smooth surface 16 (or reflective film covering the smooth surface 16 if so configured) of the light guide 10 after installation in the ceiling grid, and the light guide 10 may partially support the adjacent ceiling tiles 3.

Figure 5:
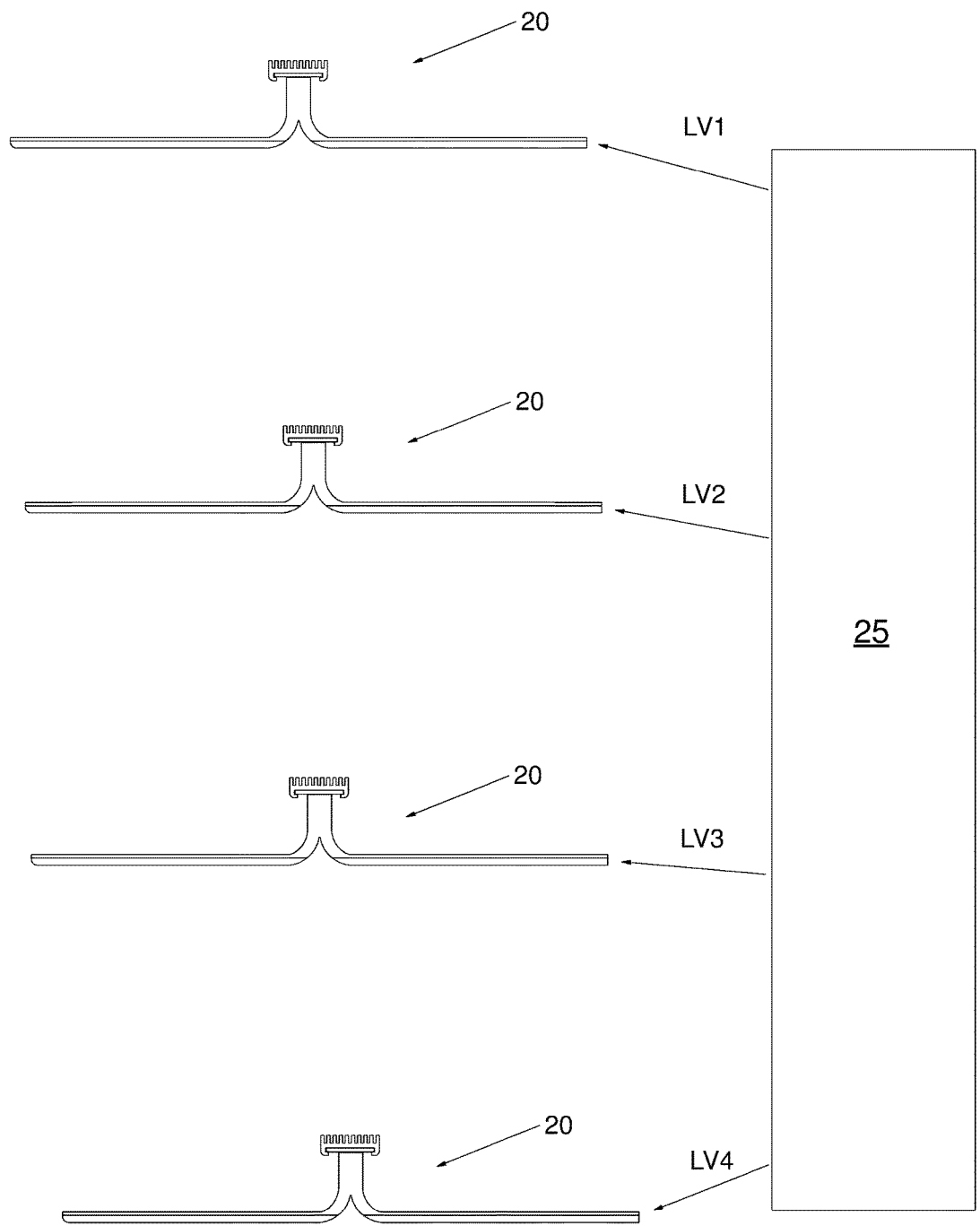
FIG. 5 shows a diagram of a remote power source connected to four example embodiments of light fixture.

In an example embodiment, multiple light fixtures may be powered by a single driver unit. Referring to FIG. 5, a driver unit 25 may include low voltage interconnect wires LV1 through LV4 to drive each light fixture 20. The driver unit may comprise two or more individual drivers, may comprise a single driver, or may comprise a single driver with multiple channels. This method of powering example embodiments of light fixture may have several advantages. Only one driver unit may be required to power many individual light fixtures, which may have significant cost saving compared to a driver unit associated with each light fixture. Remote powering of the light fixtures may allow each fixture to be very lightweight, small, and without any associated enclosure, which may represent a significant manufacturing cost savings, as well as savings associated with transportation, packaging, installation etc.

Figure 6A:
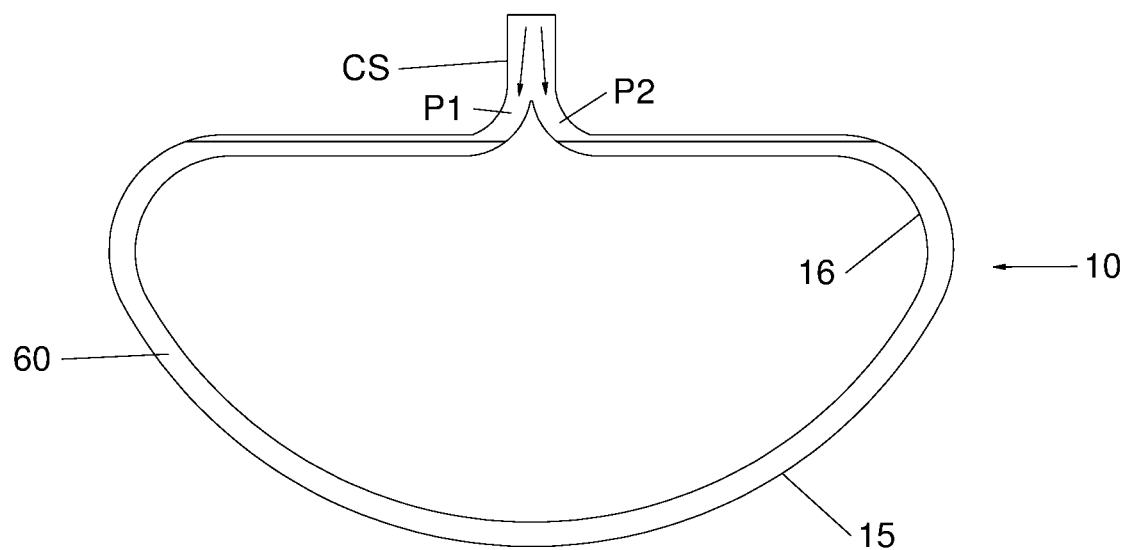
FIG. 6A shows an example embodiment of light guide comprising a light pathway configured in a loop.
Figure 6B:
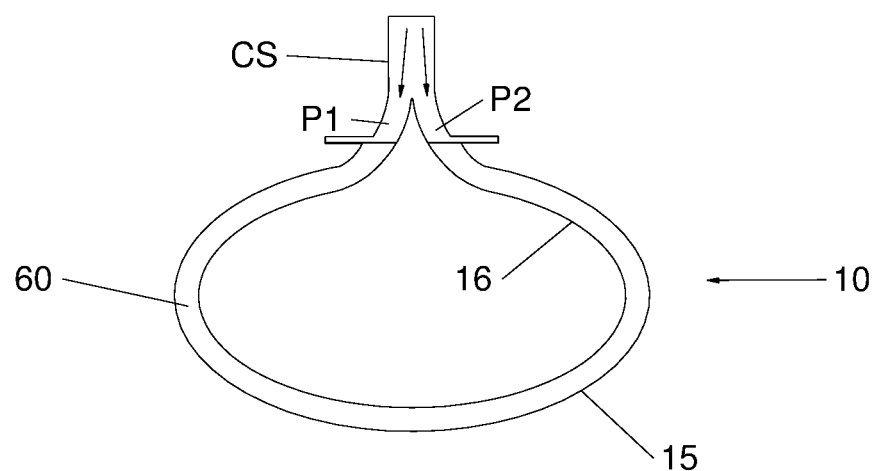
FIG. 6B shows an example embodiment of light guide comprising a light pathway configured in a loop.

In example embodiments, the light guide 10 may be configured in alternate shapes as shown in FIG. 6A and FIG. 6B, and may comprise a novel feature of a loop light guide. The central section of the light guides CS may be configured to couple with a light source as previously described. Each end of a loop section 60 may join to the central section CS, therein forming a light guide loop. Light injected into the light guide (example light rays are shown by the two arrows) may take either pathway P1 or P2. The textured surface 15 may be configured with texture on all, or whatever portion of the surface of the loop section 60 may be required for a particular application. A reflective film may be configured to nest inside the loop sections 60 and contact the smooth surface 16. Any shapes of loop section may be utilized that may be beneficial to a given application, provided the structure of the loop is compatible with the TIR functioning of the light guide.

In example embodiments, light guides may be configured in alternate shapes that may be beneficial to a given application.

An example embodiment of light fixture may now be described that may be similar to that previously described in FIG. 3A through FIG. 3C, except that the light guide may be configured to span an entire 2'×2' ceiling grid. FIG. 7D shows an exploded perspective view of the light fixture 20 mounted in a ceiling grid. The ceiling grid may comprise main runners 1 and cross runners 2. Ceiling tiles 3C and 3D may be configured by cutting a ceiling tile 3 in half, and may sit on top of the smooth side of the light guide after installation in the ceiling grid. Typically, a light fixture for use in a ceiling grid must have fire spread ratings as previously discussed. Manufacturers of luminaires may configure them in sheet metal enclosures because of this. In the example embodiment, the fire rated ceiling tiles 3C and 3D may be disposed on the smooth side of the light guide, which may form an acceptable fire barrier in the same manner as the ceiling tile 3 would. This may enable a significant manufacturing cost savings by not having to have a traditional sheet metal enclosure encasing the light fixture components.

Figure 7A:
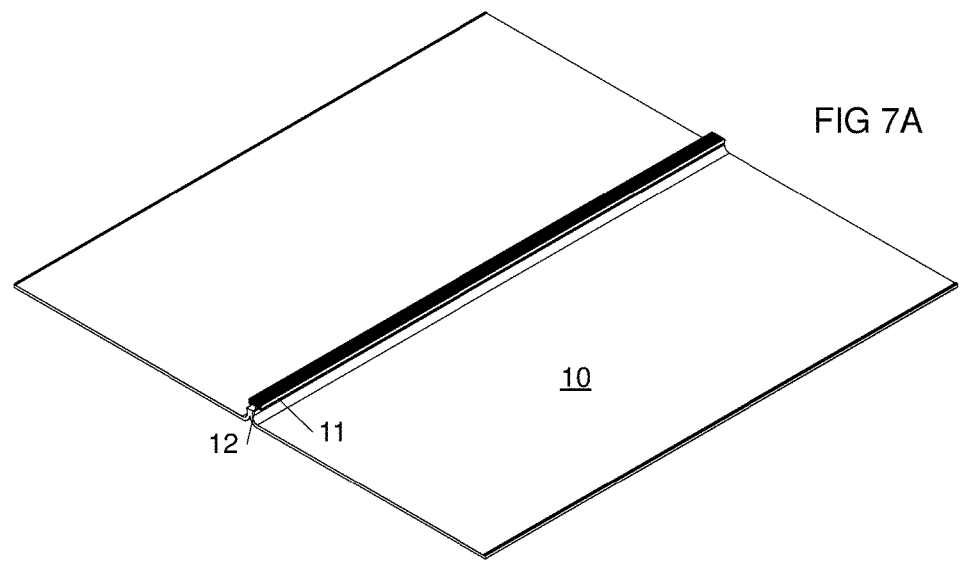
FIG. 7A shows a back perspective view of an example embodiment of light fixture comprising a light guide.
Figure 7B:
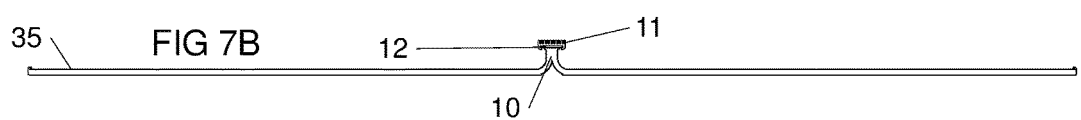
FIG. 7B shows a side view of the example embodiment of light fixture comprising a light guide as shown in FIG. 7A.
Figure 7C:
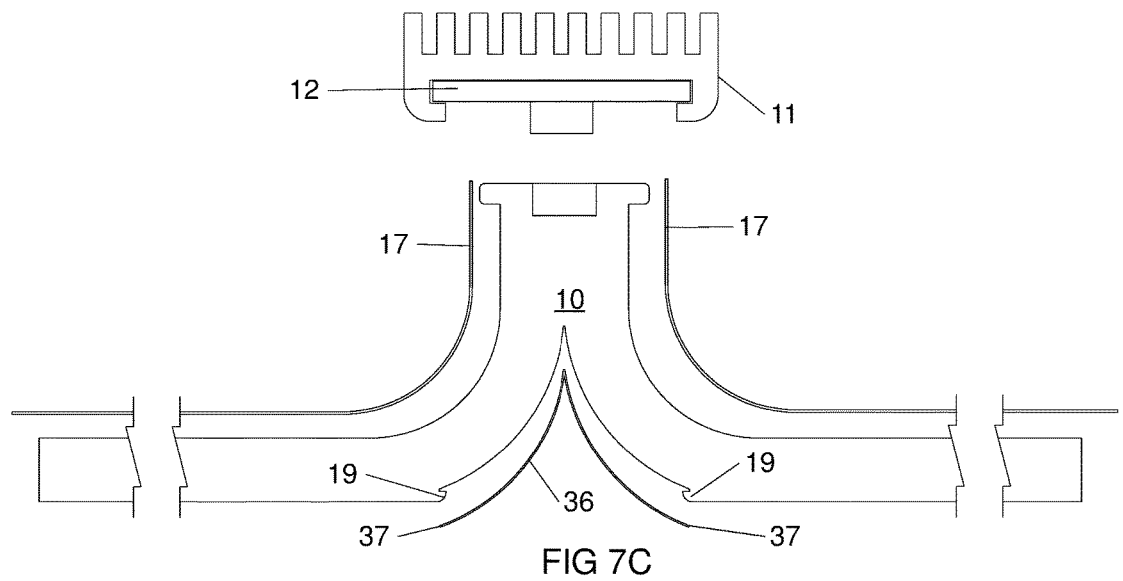
FIG. 7C shows a side view cut-away of the central section of the example embodiment of light fixture comprising a light guide as shown in FIG. 7A.
Figure 7D:
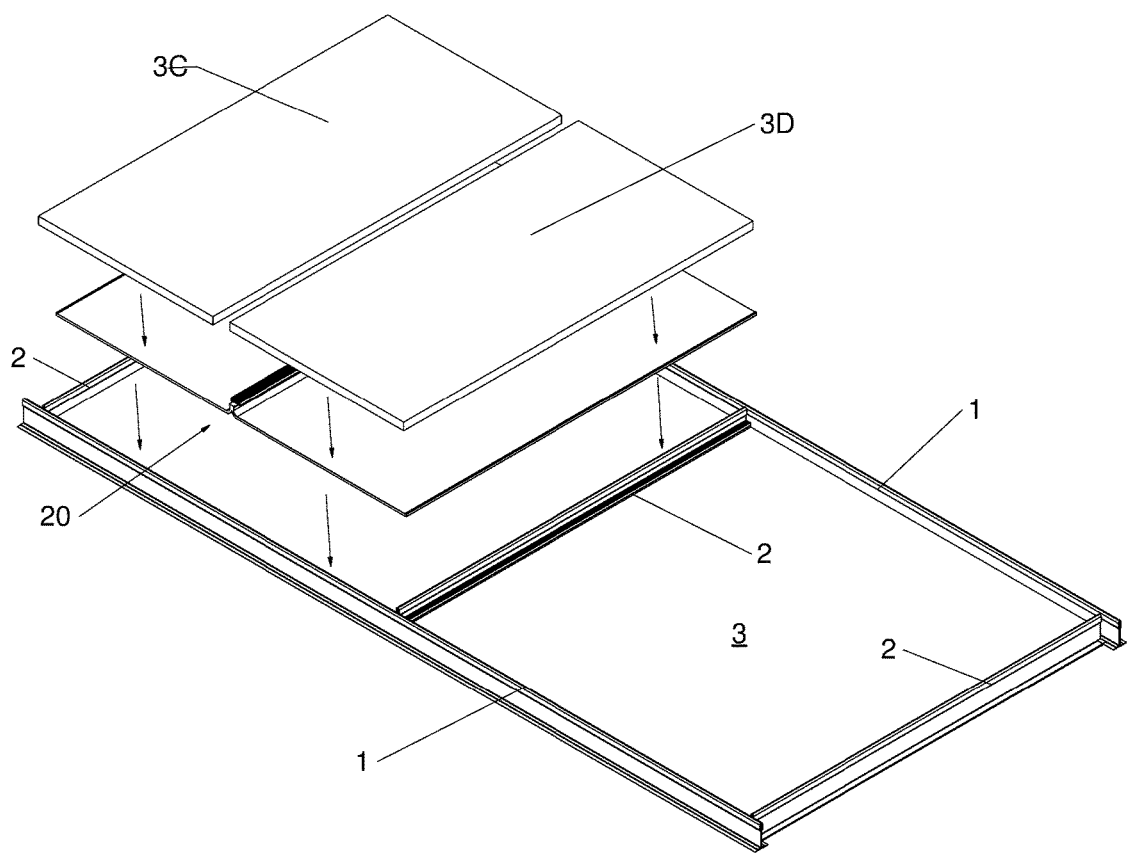
FIG. 7D shows a back perspective exploded view of the example embodiment of light fixture comprising a light guide as shown in FIG. 7A, but mounted in a portion of a suspended ceiling grid.

FIG. 7A shows a perspective of the example embodiment shown in FIG. 7D, and FIG. 7B shows a side view of the same, and FIG. 7C shows a side cut-away view. The light guide 10 may comprise an LED array 12, a heat sink 11, and a reflective sheet 17. A reflective film insert 36 may be inserted into the concave section of the light guide 10, wherein the film edges 37 may be engaged by edge retention features 19. This may enable light to be better distributed throughout the length of the light guide as previously described.

In an example embodiment of the disclosed technology, a light fixture may be configured to mount on a suspended ceiling grid. The light fixture may comprise a light guide configured for the transmission of light through total internal reflection. The light guide may comprise one or more front side surfaces, wherein each front side surface may comprise two opposing ends, wherein each opposing end may comprise an indentation. The light guide may further comprise one or more back sides, at least one edge configured for coupling with a light source, and light extracting features configured on at least a portion of one of the one or more front side surfaces. All or a portion of the indentations of opposing ends of the front surface regions of the light guide may be configured for engaging with, or being disposed in close proximity above a corresponding inner surface of a main runner in a suspended ceiling grid, and a portion of the one or more back sides of the light guide may be configured to engage with, or be disposed in close proximity below a portion of the front side of one or more ceiling tiles of the suspended ceiling grid after installation in the suspended ceiling grid.

In an example embodiment, one or more light sources may be coupled with the at least one edge of the light guide.

In an example embodiment the one or more light sources may comprise one or more linear LED arrays.

In an example embodiment, the one or more light sources may comprise one or more LED remote phosphor apparatuses.

In an example embodiment the one or more light sources may comprise one or more OLED surfaces.

In an example embodiment, the light guide may comprise a central section configured for coupling with the one or more light sources, and a planar section on each side of the central region, wherein each planar section may be oriented substantially perpendicular to the central region, and each planar section may be connected to the central section through a curved section.

In an example embodiment, each planar section of a light guide may substantially form a wedge shape profile.

In an example embodiment, the light fixture may be configured to structurally function as a cross runner in a suspended ceiling grid.

In an example embodiment, the light guide may comprise one or more pieces of reflective film attached to the back side of the light guide, wherein opposing edges of the one or more pieces of reflective film may be engaged by edge retention features configured in the light guide.

In an example embodiment, the light guide may comprise a reflective film attached to the central region of the front side of the light guide, wherein opposing edges of the reflective film may be engaged by edge retention features configured in the light guide.

In an example embodiment, the light fixture may be powered by a remote power source.

In an example embodiment, the light guide may comprise a light transmission pathway that forms a substantial portion of a loop.

In an example embodiment, the light guide may further comprise four major edges, and all or a portion of two opposing edges of the four major edges may be configured for engaging with, or being disposed in close proximity above a corresponding inner surface of a main runner in a suspended ceiling grid. The other two opposing edges of the four major edges may be configured to engage with, or being disposed in close proximity above a corresponding inner surface of one or more cross runners in the suspended ceiling grid.

In an example embodiment of the disclosed technology, a light guide may be configured for the transmission of light through total internal reflection. The light guide may comprise a central section configured for coupling with a light source, and a loop section that may comprise two ends, a front side comprising light extraction features on all or a portion of its surface, and a light reflecting back side, wherein each of the two ends may be joined to the central section, therein enabling a loop pathway for light propagation within the light guide.

In an example embodiment of the disclosed technology, a cross runner of a suspended ceiling grid may comprise a light fixture, wherein the light fixture may be configured to function as a cross runner.

In an example embodiment, the light fixture may comprise a light guide.

In an example embodiment, the light guide may be configured to emit light.

In an example embodiment, the light guide may further comprise a light source coupled to the light guide.

While certain implementations of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description may use examples to disclose certain implementations of the disclosed technology, including the best mode, and may also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A light fixture configured to mount on a suspended ceiling grid and mechanically function as a cross runner, the light fixture comprising:
   a light guide configured for the transmission of light through total internal reflection, the light guide comprising:
      one or more front side surfaces wherein each front side surface comprises two opposing ends, wherein each opposing end comprises an indentation;
      one or more back sides;
      at least one edge configured for coupling with a light source;
      light extracting features configured on at least a portion of one of the one or more front side surfaces;
   tabs configured on both opposing ends of the light fixture, wherein the tabs are configured to engage with corresponding slots in a T-bar, such that after installation the light fixture will perform similar mechanical functions as a cross runner; and
   wherein all or a portion of the indentations of opposing ends of the front side surfaces of the light guide are configured for engaging with, or being disposed in close proximity above a corresponding inner surface of a main runner in a suspended ceiling grid, and a portion of the one or more back sides of the light guide are configured to engage with, or be disposed in close proximity below a portion of the front side of one or more ceiling tiles of the suspended ceiling grid after installation of the light fixture in the suspended ceiling grid.

2. The light fixture of claim 1 comprises one or more light sources coupled with the at least one edge of the light guide.

3. The light fixture of claim 2, wherein the one or more light sources comprise one or more linear LED arrays.

4. The light fixture of claim 2, wherein the one or more light sources comprise one or more LED remote phosphor apparatuses.

5. The light fixture of claim 2, wherein the one or more light sources comprise one or more OLED surfaces.

6. The light fixture of claim 1, wherein the light guide comprises:
   a central section configured for coupling with the one or more light sources;
   a planar section on each side of the central region, wherein each planar section is oriented substantially perpendicular to the central region, and each planar section is connected to the central section through a curved section.

7. The light fixture of claim 6, wherein each planar section of the light guide substantially forms a wedge shape profile.

8. The light fixture of claim 1 is configured to structurally function as a cross runner in a suspended ceiling grid.

9. The light fixture of claim 1 further comprises one or more pieces of reflective film attached to the back side of the light guide, wherein opposing edges of the one or more pieces of reflective film are engaged by edge retention features configured in the light guide.

10. The light fixture of claim 1 further comprises a reflective film attached to the central region of the front side surfaces of the light guide, wherein opposing edges of the reflective film are engaged by edge retention features configured in the light guide.

11. The light fixture of claim 1, wherein the light fixture is powered by a remote power source.

12. The light fixture of claim 1, wherein the light guide is dimensionally configured wherein all or a portion of the outer perimeter of the front side surfaces of the light guide are configured to engage inner surfaces of a 2'×2' section of T-bar frame members of a suspended grid frame ceiling.

* * * * *